US012621792B2

(12) United States Patent
Dong

(10) Patent No.: US 12,621,792 B2
(45) Date of Patent: May 5, 2026

(54) METHOD AND APPARATUS FOR REQUESTING PRS CONFIGURATION, AND COMMUNICATION DEVICE AND STORAGE MEDIUM

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 465 days.

(21) Appl. No.: 18/248,613

(22) PCT Filed: Oct. 12, 2020

(86) PCT No.: PCT/CN2020/120483
§ 371 (c)(1),
(2) Date: Apr. 11, 2023

(87) PCT Pub. No.: WO2022/077184
PCT Pub. Date: Apr. 21, 2022

(65) Prior Publication Data
US 2023/0413218 A1 Dec. 21, 2023

(51) Int. Cl.
*H04W 64/00* (2009.01)
*H04L 5/00* (2006.01)
(52) U.S. Cl.
CPC ........... *H04W 64/00* (2013.01); *H04L 5/0051* (2013.01)

(58) Field of Classification Search
None
See application file for complete search history.

(56) References Cited

U.S. PATENT DOCUMENTS

| | | | |
|---|---|---|---|
| 2019/0297489 A1 | 9/2019 | Lei et al. | |
| 2020/0154240 A1 | 5/2020 | Edge et al. | |
| 2021/0297216 A1* | 9/2021 | Shreevastav | H04L 5/0048 |
| 2021/0333353 A1* | 10/2021 | Busin | G01S 5/0278 |
| 2022/0022158 A1* | 1/2022 | Zarifi | H04L 5/0048 |

FOREIGN PATENT DOCUMENTS

| | | |
|---|---|---|
| CN | 105532058 A | 4/2016 |
| WO | WO 2020026211 A1 | 2/2020 |
| WO | 2020092714 A1 | 5/2020 |
| WO | WO 2020092715 A1 | 5/2020 |

OTHER PUBLICATIONS

Notice of Reasons for Refusal issued by the Japanese Patent Office on Apr. 23, 2024, in corresponding Application No. JP 2023-522534, 8 pages.

(Continued)

*Primary Examiner* — Suhail Khan
(74) *Attorney, Agent, or Firm* — Finnegan, Henderson, Farabow, Garrett & Dunner, L.L.P.

(57) ABSTRACT

A method for requesting a positioning reference signal (PRS) configuration is performed by a communication node, and includes: sending a message carrying a suggested PRS configuration, wherein the suggested PRS configuration is a PRS configuration suggested by the communication node for terminal positioning.

13 Claims, 9 Drawing Sheets

(56)          References Cited

OTHER PUBLICATIONS

International Search Report and Written Opinion of International Application No. PCT/CN2020/120483, dated Jun. 24, 2021, 16 pages.

Office Action (Enquiry) for Russian Application No. 2023112087/07, issued on Nov. 13, 2023, 21 pages.

European Patent Office, Extended European Search Report issued in Application No. 20956966.4 dated Oct. 26, 2023, 15 pages.

QualComm Incorporated, "On Demand Transmission of PRS for NR", 3GPP TSG-RAN WG2 Meeting #105, R2-1901373, Athens, Greece, Feb. 25-Mar. 1, 2019, 15 pages.

First Office Action issued by the State Intellectual Property Office of People's Republic of China on Dec. 31, 2024, in corresponding Application No. CN 202080002714.X, 17 pages.

Reconsideration Report before Appeal issued by the Japanese Patent Office on Mar. 11, 2025, in corresponding Application No. JP 2023-52534, 7 pages.

"On Demand Transmission of PRS for NR", Qualcomm Incorporated, 3GPP TSG-RAN WG2 Meeting #104, R2-1817902, Spokane, USA, Nov. 12-16, 2018, 28 pages.

The Second Office Action issued by the State Intellectual Property Office of People's Republic of China on Jul. 19, 2025, in corresponding Application No. CN 202080002714.X, 21 pages.

* cited by examiner step 161, receiving a message carrying a target PRS configuration for a terminal to perform positioning measurement, wherein the target PRS configuration is determined according to a suggested PRS configuration apparatus for requesting a PRS configuration second receiving module

— 191

900

Processing Component    922

Power Component    926

Memory    932

Network Interface (s)    950

I/ O Interface    958

METHOD AND APPARATUS FOR REQUESTING PRS CONFIGURATION, AND COMMUNICATION DEVICE AND STORAGE MEDIUM

CROSS-REFERENCE TO RELATED APPLICATION

This application is a national phase of International Application No. PCT/CN2020/120483, filed on Oct. 12, 2020, the entire content of which is incorporated herein by reference.

TECHNICAL FIELD

The disclosure relates to the field of wireless communication technologies but is not limited to the field of wireless communication technologies, and in particular, to a method and an apparatus for requesting a positioning reference signal (PRS) configuration, a communication device, and a storage medium.

BACKGROUND

The $5^{th}$ generation (5G) mobile communication technology in the release 16 (R16) introduces various terminal positioning technologies, all of which can realize the terminal positioning. When a network needs to position a terminal, a location management function (LMF) sends a positioning request to the terminal. After receiving the positioning request, the terminal completes a positioning measurement of a positioning reference signal (PRS) according to information carried in the positioning request, and reports a positioning measurement result or location information of the terminal, to complete a positioning process of the terminal.

SUMMARY

According to a first aspect of the disclosure, a method for requesting a PRS configuration is provided. The method is applicable to a first communication node. The method includes: sending a message carrying a suggested PRS configuration, in which the suggested PRS configuration is a PRS configuration suggested by the first communication node for terminal positioning.

According to a second aspect of the disclosure, a method for requesting a PRS configuration is provided. The method is applicable to a second communication node. The method includes: receiving a message carrying a suggested PRS configuration, in which the suggested PRS configuration is a PRS configuration suggested for terminal positioning.

According to a third aspect of the disclosure, a method for requesting a PRS configuration is provided. The method is applicable to a third communication node. The method includes: receiving a message carrying a target PRS configuration for a terminal to perform positioning measurement, in which the target PRS configuration is determined according to a suggested PRS configuration.

According to a fourth aspect of the disclosure, a communication device is provided. The communication device includes: a processor; and a memory for storing processor-executable instructions. The processor is configured to execute the executable instructions, to perform the method described above.

According to a fifth aspect of the disclosure, a non-transitory computer storage medium is provided. The computer storage medium stores a computer-executable program, and when the executable program is executed by a processor, the method described above in the disclosure is performed.

DETAILED DESCRIPTION

Reference will now be made in detail to some embodiments, examples of which are illustrated in the accompanying drawings. The following description refers to the accompanying drawings in which the same numbers in different drawings represent the same or similar elements unless otherwise represented. The implementations set forth in the following description of some embodiments do not represent all implementations consistent with the disclosure. Instead, they are merely examples of apparatuses and methods consistent with aspects related to the disclosure as recited in the appended claims.

The terms used in embodiments of the disclosure are only for the purpose of describing specific embodiments, and are not intended to limit the disclosure. The singular forms of "a" and "the" used in the disclosure and appended claims are also intended to include plural forms, unless the context clearly indicates other meanings. It should also be understood that the term "and/or" as used herein refers to and includes any or all possible combinations of one or more associated listed items.

It should be understood that although the terms first, second, and third may be used in this disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the word "if" as used herein can be interpreted as "when", "while" or "in response to determining".

For the purpose of concision and easy understanding, the terms "greater than" or "less than" are used herein when characterizing a relationship of sizes. However, those skilled in the art can understand that the term "greater than" also covers the meaning of "greater than or equal to", and the term "less than" also covers the meaning of "less than or equal to".

Figure 1:
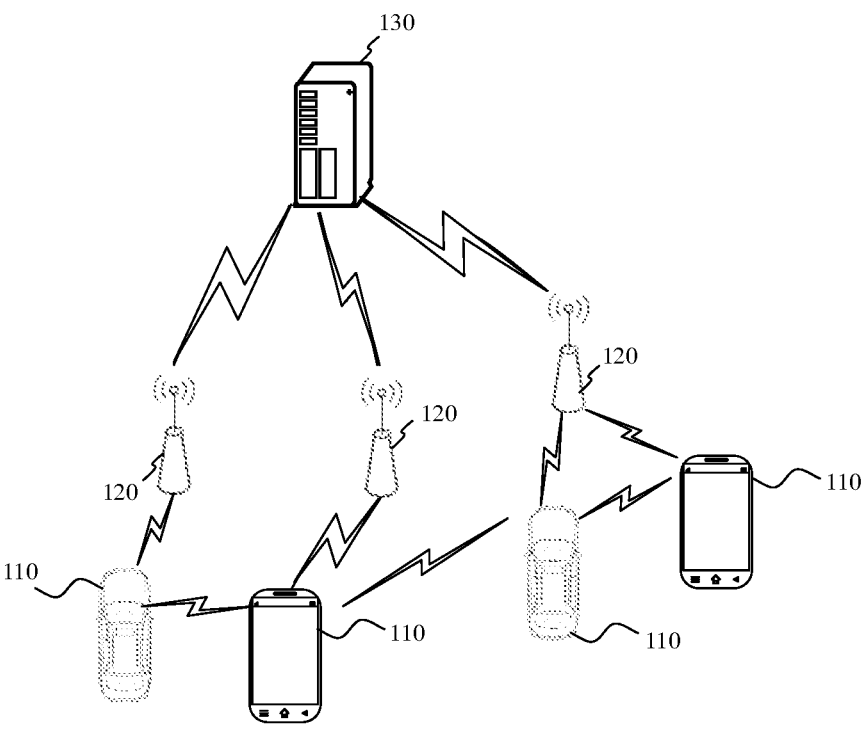
FIG. 1 is a schematic diagram of a wireless communication system according to some embodiments.

Referring to FIG. 1, FIG. 1 illustrates a schematic diagram of a wireless communication system according to some embodiments of the disclosure. As illustrated in FIG. 1, the wireless communication system is a communication system based on cellular mobile communication technologies. The wireless communication system includes terminals 110 and base stations 120.

The terminal 110 may be a device that provides voice and/or data connectivity to a user. The terminal 110 may communicate with one or more core networks via a radio access network (RAN). The terminal 110 may be an Internet of Things (IoT) user equipment (UE) such as a sensor device, a mobile phone (or "cellular" phone) and a computer with the IoT UE. The terminal 110 may be a fixed, portable, pocket, hand-held, computer built-in or a vehicle-mounted device, for example, a station (STA), a subscriber unit, a subscriber station, a mobile station, a mobile, a remote station, an access point, a remote terminal, an access terminal, a user terminal, a user agent, a user device, or a UE. Alternatively, the terminal 110 may also be a device of an unmanned aerial vehicle. Alternatively, the terminal 110 may also be a vehicle-mounted device, for example, an engine control unit (ECU) with a wireless communication function or a wireless communication device externally connected to the ECU. Alternatively, the terminal 110 may also be a roadside device, for example, a street light, a signal light, or other roadside devices with a wireless communication function.

The base station 120 may be a network-side device in the wireless communication system. The wireless communication system may be a 4$^{th}$ generation (4G) mobile communication system, also known as a long term evolution (LTE) system. Or, the wireless communication system may also be a 5$^{th}$ generation (5G) mobile communication system, also known as a new radio (NR) system or 5G NR system. Alternatively, the wireless communication system may also be a next-generation system of the 5G system. The access network in the 5G system may be called new generation-radio access network (NG-RAN).

The base station 120 may be an evolved base station (eNB) employed in the 4G system. Alternatively, the base station 120 may also be a base station (gNB) that adopts a centralized distributed architecture in the 5G system. When the base station 120 adopts the centralized distributed architecture, it usually includes a central unit (CU) and at least two distributed units (DUs). The central unit is provided with protocol stacks of a packet data convergence protocol (PDCP) layer, a radio link control (RLC) layer, and a media access control (MAC) layer. A protocol stack of a physical (PHY) layer is set in the DU. The specific implementation manner of the base station 120 is not limited in embodiments of the disclosure.

A wireless connection can be established between the base station 120 and the terminal 110 through a radio air interface. In different embodiments, the radio air interface may be a radio air interface based on the 4G mobile communication network technology standard, or the radio air interface may be a radio air interface based on the 5G mobile communication network technology standard, for example, the radio air interface is a NR, or, the radio air interface may also be a radio air interface based on a next generation of 5G mobile communication network technology standard.

In some embodiments, an end to end (E2E) connection may also be established between the terminals 110, for example, scenes of vehicle to vehicle (V2V) communication, vehicle to infrastructure (V2I) communication and vehicle to pedestrian (V2P) communication in vehicle to everything (V2X) communication.

Herein, the above UE may be regarded as the terminal device of the following embodiments.

In some embodiments, the above wireless communication system may further include a network management device 130.

Base stations 120 are connected to the network management device 130 respectively. The network management device 130 may be a core network device in the wireless communication system, for example, the network management device 130 may be a mobility management entity (MME) in an evolved packet core (EPC). Alternatively, the network management device may also be other core network devices, such as a serving gateway (SGW), a public data network gateway (PGW), a policy and charging rules function (PCRF) or a home subscriber server (HSS). The implementation form of the network management device 130 is not limited in some embodiments of the disclosure.

To better understand the technical solution described in any of embodiments of the disclosure, first, a scenario of terminal positioning is described through some embodiments.

Figure 2:
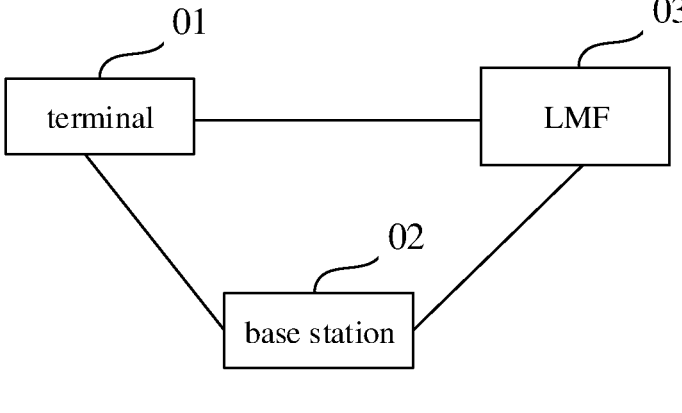
FIG. 2 is a schematic diagram of a communication system according to some embodiments.

Referring to FIG. 2, a wireless network communication system includes a terminal 01, a base station 02, and a location management function (LMF) 03. The 5$^{th}$ generation (5G) mobile communication technology in the release 16 (R16) introduces various terminal positioning technologies, all of which can realize the terminal positioning. Some positioning technologies among the various positioning technologies use a PRS.

In some embodiments, the base station sends the PRS configuration to the LMF, and the LMF in turn sends the PRS configuration to the terminal. The terminal performs terminal positioning based on the PRS configuration.

Figures 3, 4, 5:
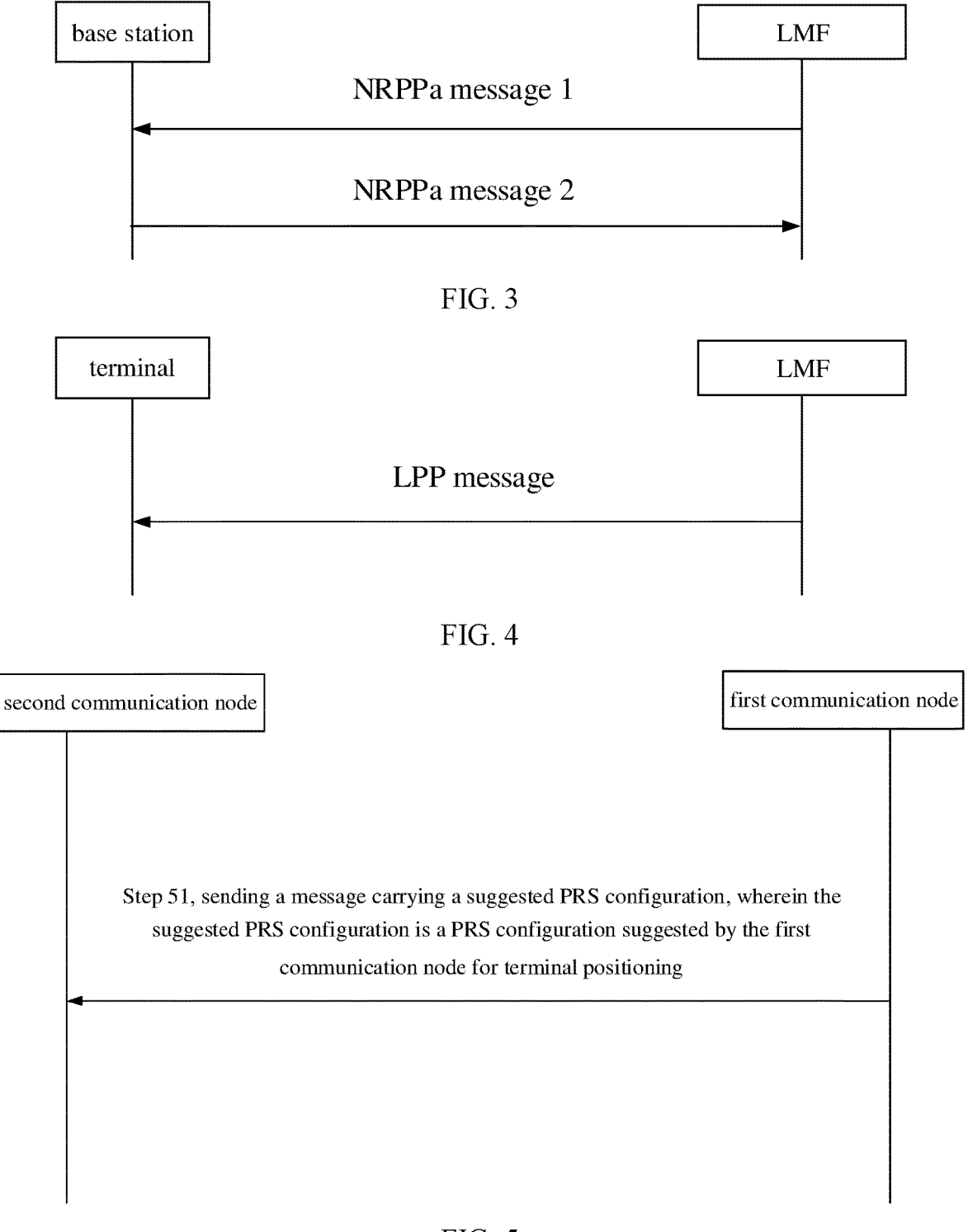
FIG. 3 is a schematic diagram illustrating a positioning method according to some embodiments.
FIG. 4 is a schematic diagram illustrating a positioning method according to some embodiments.
FIG. 5 is a flowchart of a method for requesting a PRS configuration according to some embodiments.

In some embodiments, referring to FIG. 3, the LMF requests the base station for observed time difference of arrival (OTDOA) information through a new radio positioning protocol A (NRPPa) message. After receiving the NRPPa message, the base station sends a response message to the LMF. Herein, the response message is also a NRPPa message. The response message contains the PRS configuration. After the LMF receives the PRS configuration, it can send the PRS configuration to the terminal through a longterm-evolution (LTE) positioning protocol (LPP) message, see FIG. 4. In the above manner, the LMF includes the PRS configuration determined by the base station into the LPP message sent to the terminal.

In some embodiments, the LMF provides a positioning system messages to the base station. The base station sends the positioning system message. The positioning system message includes the PRS configuration.

In some embodiments, the PRS configuration is sent periodically, and the PRS configuration includes a configuration of different parameters, for example, the PRS configuration includes a configuration on a period, a bandwidth, a pattern, and the like parameters. In some embodiments, it is necessary to configure parameters of the PRS for the base station through operation administration and maintenance (OAM). Therefore, the PRS configuration is a semi-static configuration, and a cell-level parameter is configured. The PRS configuration may not be dynamically changed, and different PRS parameters may not be configured for different terminals, so the PRS configuration may not satisfy positioning requirements of different terminals.

As illustrated in FIG. 5, some embodiments provide a method for requesting a PRS configuration, which is applicable to a first communication node. The method includes the following step.

In step 51: a message carrying a suggested PRS configuration is sent, in which the suggested PRS configuration is a PRS configuration suggested by the first communication node for terminal positioning.

In some embodiments of the disclosure, the first communication node may be a terminal. The terminal may be, but is not limited to, a mobile phone, a wearable device, a vehicle-mounted terminal, a roadside unit (RSU), a smart home terminal, an industrial sensing device and/or a medical device, and the like. In some embodiments of the disclosure, the first communication node may be a core network element. In some embodiments of the disclosure, the core network element may be an LMF.

Some embodiments of the disclosure provide a method for a terminal to request a PRS configuration, including: the terminal sending a message carrying a suggested PRS configuration to a first base station. The first base station is an interface device for the terminal to access the network. The first base station may be various types of base stations, for example, a base station of the 3G network, a base station of the 4G network, a base station of the 5G network, or other evolved base station.

In some embodiments, the terminal may send a radio resource control (RRC) message carrying the suggested PRS configuration to the first base station. The first base station determines a target PRS configuration based on the suggested PRS configuration and sends a RRC message carrying the target PRS configuration to the terminal; and/or, the first base station determines a target PRS configuration based on the suggested PRS configuration and sends an NRPPa message carrying the target PRS configuration to the LMF.

In some embodiments, after the LMF receives the NRPPa message carrying the target PRS configuration, if transmission and reception points (TRPs) for the terminal to perform positioning belong to multiple different base stations, a message carrying the target PRS configuration is sent to a second base station, in which the multiple different base stations include the first base station and the second base station. In some embodiments, an NRPPa message carrying the target PRS configuration is sent to the second base station.

It should be noted that those skilled in the art can understand that a method for a terminal to request a PRS configuration provided in some embodiments of the disclosure may be executed independently, or may be performed with any one of methods in embodiments of the disclosure or any one of methods in the related art together.

Some embodiments of the disclosure provide a method for a terminal to request a PRS configuration, including: the terminal sending a message carrying a suggested PRS configuration to a core network element.

In some embodiments of the disclosure, the core network element may be an LMF.

In some embodiments, the terminal may send an LPP message carrying the suggested PRS configuration to the core network element (LMF). The core network element (LMF) determines a target PRS configuration based on the suggested PRS configuration and sends an LPP message carrying the target PRS configuration to the terminal; and/or, the core network element (LMF) determines a target PRS configuration based on the suggested PRS configuration and sends an NRPPa message carrying the target PRS configuration to the first base station.

It should be noted that those skilled in the art can understand that a method for a terminal to request a PRS configuration provided in some embodiments of the disclosure may be executed independently, or may be performed with any one of methods in embodiments of the disclosure or any one of methods in the related art together.

In some embodiments, the first communication node may be a core network element. The core network element may be an LMF. In some embodiments, it may be that the LMF sends the message carrying the suggested PRS configuration to the first base station.

Some embodiments of the disclosure provide a method for a core network element to request a PRS configuration, which may be that the LMF sends an NRPPa messages carrying the suggested PRS configuration to the first base station. The first base station determines a target PRS configuration based on the suggested PRS configuration and sends an NRPPa message carrying the target PRS configuration to the terminal; and/or, the first base station determines a target PRS configuration based on the suggested PRS configuration and sends an NRPPa message carrying the target PRS configuration to the LMF, and the LMF then sends an LPP message carrying the target PRS configuration to the terminal.

It should be noted that those skilled in the art can understand that a method for a core network element for requesting a PRS configuration provided in some embodiments of the disclosure may be executed independently, or may be performed with any one of methods in embodiments of the disclosure or any one of methods in the related art together.

In any of the above embodiments, there is at least one suggested PRS configuration.

In any of the above embodiments, the suggested PRS configuration includes at least one of the following parameters: a transmission period of the PRS; a transmission bandwidth of the PRS; or a transmission pattern of the PRS.

In any of the above embodiments, the suggested PRS configuration may be determined according to positioning requirements.

In any of the above embodiments, in response to a need of positioning the terminal in real time, the transmission period of the PRS may be set to be smaller than a period threshold at any time. In this way, the terminal can position the terminal in real time. Herein, to position the terminal in real time, a period shorter than a target period may be used as a positioning measurement period to perform positioning measurement on the terminal.

In any of the above embodiments, when a positioning accuracy requirement for positioning the terminal is greater than an accuracy threshold, the transmission bandwidth of the PRS can be set as a first transmission bandwidth at any time; and when the positioning accuracy requirement for positioning the terminal is less than the accuracy threshold, the transmission bandwidth of the PRS can be set as a second transmission bandwidth. Herein, a width corresponding to the first transmission bandwidth is greater than a width corresponding to the second transmission bandwidth.

In any of the above embodiments, when the positioning accuracy requirement for positioning the terminal is greater than the accuracy threshold, the transmission pattern of the PRS can be set as a first transmission pattern at any time; and when the positioning accuracy requirement for positioning the terminal is less than the accuracy threshold, the transmission pattern of the PRS can be set as a second transmission pattern. Herein, a resource distribution density corresponding to the first transmission pattern is greater than a resource distribution density corresponding to the second transmission pattern.

In any embodiment of the disclosure, the first communication node sends the message carrying the suggested PRS configuration, in which the suggested PRS configuration is suggested by the first communication node for positioning the terminal. In this way, the first communication node can determine the suggested PRS configuration according to requirements and send the message carrying the suggested PRS configuration. The second communication node can receive the message carrying the suggested PRS configuration and determine the target PRS configuration from the suggested PRS configuration for the terminal to perform positioning measurement. Compared with the method in which the terminal can use a single PRS configuration only to perform positioning measurement, positioning is performed according to the target PRS configuration determined by the message of the suggested PRS configuration, which can satisfy positioning requirements of different terminals. In some embodiments of the disclosure, the first communication node may be the terminal. In some embodiments of the disclosure, the first communication node may be the core network element.

Figure 6:
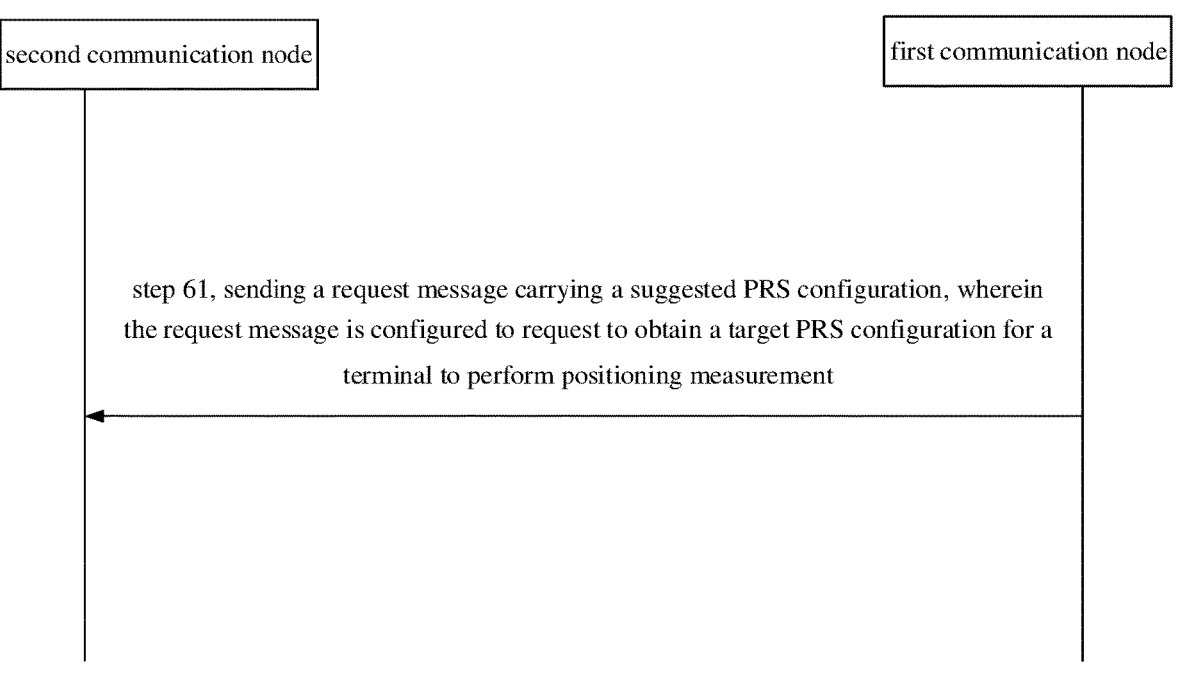
FIG. 6 is a flowchart of a method for requesting a PRS configuration according to some embodiments.

As illustrated in FIG. 6, some embodiments provide a method for requesting a PRS configuration. The method includes the following step.

At step 61: a request message carrying a suggested PRS configuration is sent, in which the request message is configured to request to obtain a target PRS configuration for a terminal to perform positioning measurement, and the suggested PRS configuration is a PRS configuration suggested by the first communication node for terminal positioning.

Some embodiments of the disclosure provide a method for a terminal to request a PRS configuration, including: a terminal sending a request message carrying a suggested PRS configuration, in which the request message is configured to request to obtain a target PRS configuration for the terminal to perform positioning measurement; and the suggested PRS configuration is a PRS configuration suggested by the first communication node for terminal positioning.

In some embodiments of the disclosure, the terminal sending the request message carrying the suggested PRS configuration, includes: sending a random access request message carrying the suggested PRS configuration to the first base station; or, sending an RRC message carrying the suggested PRS configuration to the first base station.

It should be noted that those skilled in the art can understand that a method for a terminal to request a PRS configuration provided in some embodiments of the disclosure may be executed independently, or may be performed with any one of methods in embodiments of the disclosure or any one of methods in the related art together.

In some embodiments of the disclosure, an RRC message carrying the suggested PRS configuration may be sent to the first base station in response to a positioning requirement of the terminal. Herein, the terminal has the positioning requirement, which may be that an application used for positioning in the terminal is activated.

In some embodiments of the disclosure, the terminal may periodically send an RRC message carrying the suggested PRS configuration to the first base station until it receives an RRC message carrying a target PRS configuration from the first base station. In this way, it can be ensured that the terminal can obtain the target PRS configuration reliably.

Figure 7:
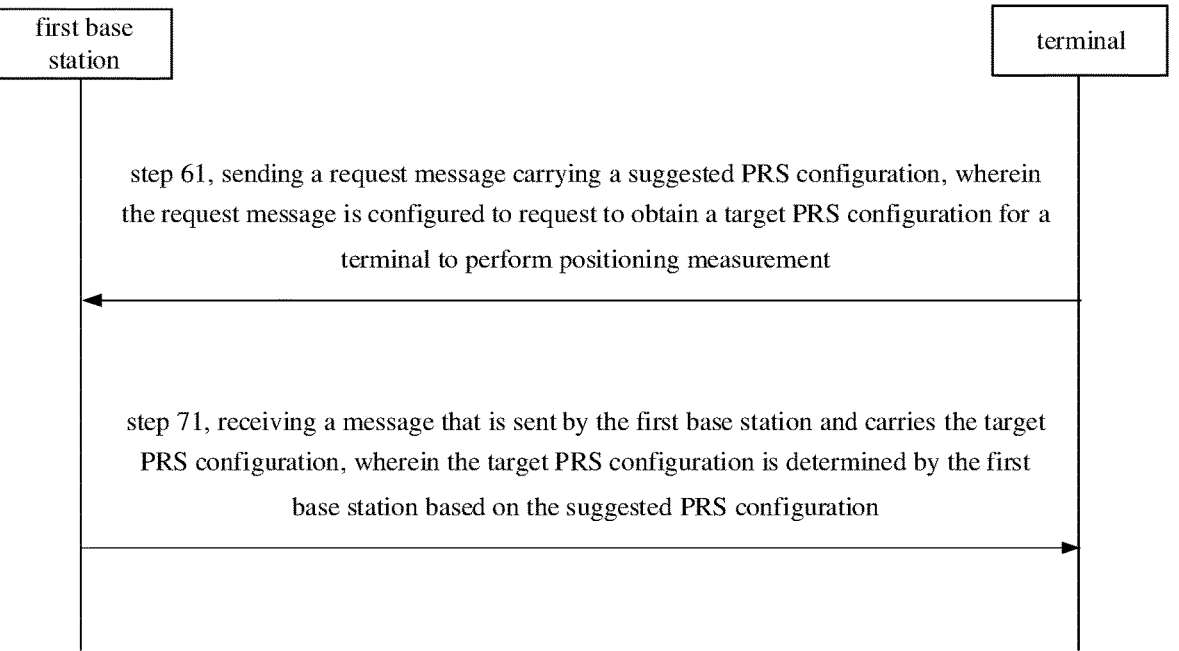
FIG. 7 is a flowchart of a method for requesting a PRS configuration according to some embodiments.

As illustrated in FIG. 7, some embodiments of the disclosure provide a method for requesting a PRS configuration. The method includes the following steps.

At step 71: a message that is sent by the first base station and carries the target PRS configuration is received, in which the target PRS configuration is determined by the first base station based on the suggested PRS configuration.

It should be noted that those skilled in the art can understand that a method for requesting a PRS configuration provided in some embodiments of the disclosure may be executed independently, or may be performed with any one of methods in embodiments of the disclosure or any one of methods in the related art together.

Some embodiments of the disclosure provide a method for a terminal to request a PRS configuration, including: the terminal receiving an RRC message that carries the target PRS configuration and is sent by the first base station.

In some embodiments of the disclosure, the target PRS configuration may be one PRS configuration selected by the first base station from a plurality of suggested PRS configurations.

In some embodiments of the disclosure, the target PRS configuration may be determined based on a channel quality. For example, when the channel quality is greater than a quality threshold, a PRS configuration including a long period for transmitting a PRS may be selected; and when the channel quality is less than the quality threshold, a PRS configuration including a short period for transmitting a PRS may be selected. In this way, it can be ensured that the terminal can reliably receive the PRS.

In some embodiments of the disclosure, the target PRS configuration may be determined according to a bandwidth occupancy ratio of bandwidth resources. For example, when the bandwidth occupancy ratio of the bandwidth resources is smaller than a ratio threshold, a PRS configuration including a large bandwidth for transmitting a PRS can be selected; and when the bandwidth occupancy ratio of the bandwidth resources is greater than the ratio threshold, a PRS configuration including a small bandwidth for transmitting a PRS can be selected.

Some embodiments of the disclosure provide a method for a terminal to request a PRS configuration. The method includes: sending the request message carrying the suggested PRS configuration, including the following.

The terminal sends an LPP message carrying the suggested PRS configuration to the core network element. The LPP message is configured to request to obtain the target PRS configuration for the terminal to perform positioning measurement; and the suggested PRS configuration is suggested by the first communication node for the terminal to perform positioning.

In some embodiments of the disclosure, in response to the terminal having a positioning requirement, the LPP message carrying the suggested PRS configuration is sent to the core network element. Herein, the terminal has the positioning requirement, which may be that an application used for positioning in the terminal is activated.

In some embodiments of the disclosure, the terminal may periodically send the LPP message carrying the suggested PRS configuration to the core network element until receiving a message sent by the core network element. The LPP message carrying the target PRS configuration. In this way, it can be ensured that the terminal can obtain the target PRS configuration reliably.

Figure 8:
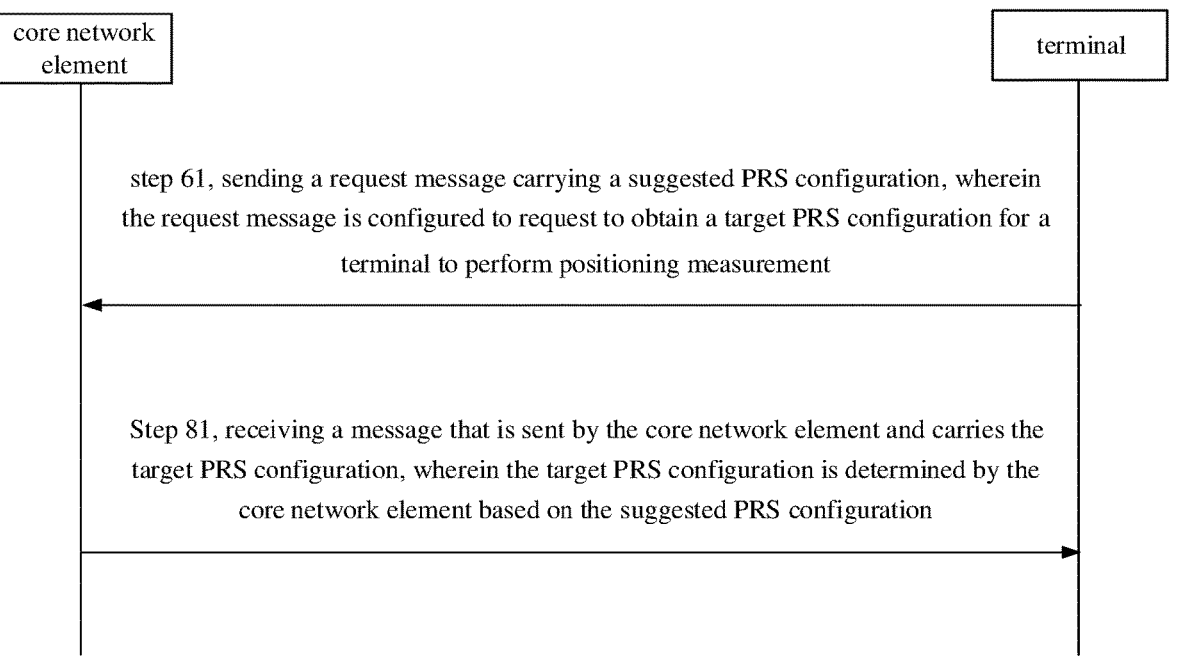
FIG. 8 is a flowchart of a method for requesting a PRS configuration according to some embodiments.

As illustrated in FIG. 8, some embodiments provide a method for requesting a PRS configuration. The method includes the following steps.

At step 81: a message that is sent by the core network element and carries the target PRS configuration is received, in which the target PRS configuration is determined by the core network element based on the suggested PRS configuration.

Some embodiments provide a method for a terminal to request a PRS configuration. The method includes that: the terminal receiving an LPP message that carries the target PRS configuration and is sent by the core network element.

In some embodiments of the disclosure, the target PRS configuration may be one PRS configuration selected from a plurality of suggested PRS configurations.

In some embodiments of the disclosure, the target PRS configuration may be determined based on a channel quality. For example, when the channel quality is greater than a quality threshold, a PRS configuration including a long period for transmitting a PRS may be selected; and when the channel quality is less than the quality threshold, a PRS configuration including a short period for transmitting a PRS may be selected. In this way, it can be ensured that the terminal can reliably receive the PRS.

In some embodiments of the disclosure, the target PRS configuration may be determined according to a bandwidth occupancy ratio of bandwidth resources. For example, when the bandwidth occupancy ratio of the bandwidth resources is smaller than a ratio threshold, a PRS configuration including a large bandwidth for transmitting a PRS can be selected; and when the bandwidth occupancy ratio of the bandwidth resources is greater than the ratio threshold, a PRS configuration including a small bandwidth for transmitting a PRS can be selected.

Some embodiments of the disclosure provide a method for a core network element to request a PRS configuration, and the method includes the following.

The core network element sends an NRPPa message carrying the suggested PRS configuration to the first base station. The NRPPa message is configured to request to obtain the target PRS configuration for the terminal to perform positioning measurement; and the suggested PRS configuration is suggested by the first communication node for terminal positioning.

In some embodiments of the disclosure, in response to the core network element having a positioning request or the core network element receiving a positioning request, the NRPPa message carrying the suggested PRS configuration may be sent to the first base station.

In some embodiments of the disclosure, the core network element may periodically send the NRPPa message carrying the suggested PRS configuration to the first base station until the NRPPa message that is sent by the first base station and carries the target PRS configuration is received. In this way, it can be ensured that the core network element can obtain the target PRS configuration reliably.

Figure 9:
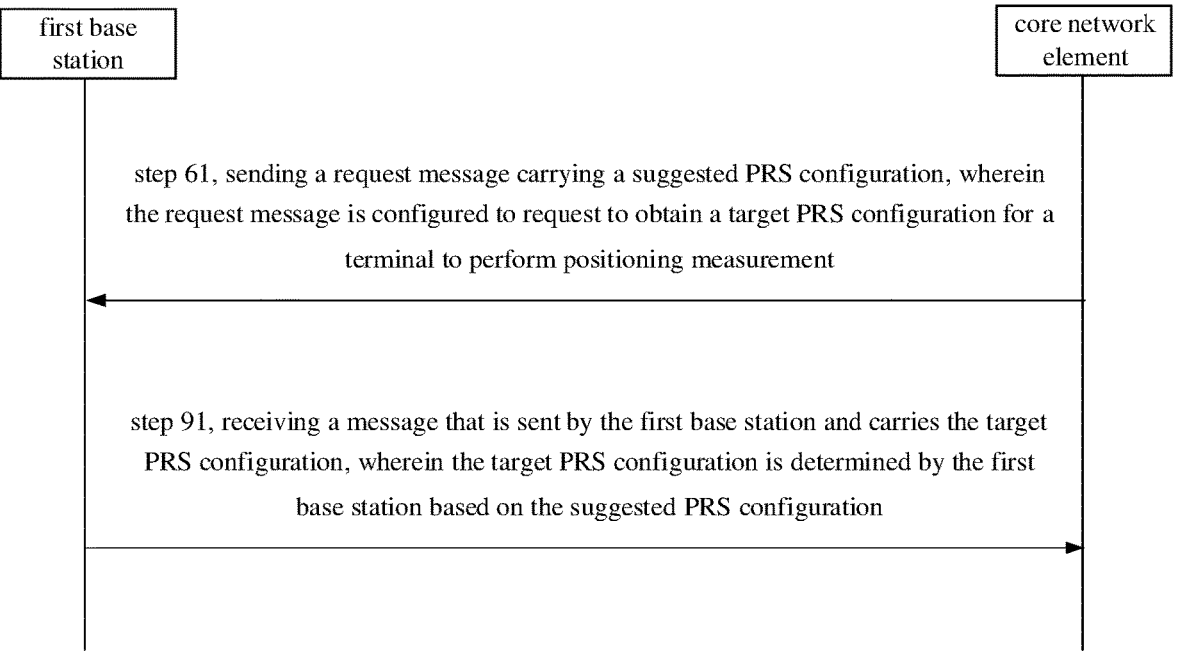
FIG. 9 is a flowchart of a method for requesting a PRS configuration according to some embodiments.

As illustrated in FIG. 9, some embodiments provide a method for requesting a PRS configuration. The method includes the following steps.

At step 91: a message that is sent by the first base station and carries the target PRS configuration is received, in which the target PRS configuration is determined by the first base station based on the suggested PRS configuration.

In some embodiments of the disclosure, receiving the message that is sent by the first base station and that carries the target PRS configuration includes: the core network element receiving an NRPPa message that carries the target PRS configuration and sent by the first base station.

In some embodiments of the disclosure, the target PRS configuration may be one PRS configuration selected from a plurality of suggested PRS configurations.

In some embodiments of the disclosure, the target PRS configuration may be determined based on a channel quality. For example, when the channel quality is greater than a quality threshold, a PRS configuration including a long period for transmitting a PRS may be selected; and when the channel quality is less than the quality threshold, a PRS configuration including a short period for transmitting a PRS may be selected. In this way, it can be ensured that the terminal can reliably receive the PRS.

In some embodiments of the disclosure, the target PRS configuration may be determined according to a bandwidth occupancy ratio of bandwidth resources. For example, when the bandwidth occupancy ratio of the bandwidth resources is smaller than a ratio threshold, a PRS configuration including a large bandwidth for transmitting a PRS can be selected; and when the bandwidth occupancy ratio of the bandwidth resources is greater than the ratio threshold, a PRS configuration including a small bandwidth for transmitting a PRS can be selected.

In some embodiments of the disclosure, the method further includes: sending a message carrying the target PRS configuration to the terminal.

In some embodiments, sending the message carrying the target PRS configuration to the terminal includes: the core network element sending an LPP message carrying the target PRS configuration to the terminal.

Figures 10, 11:
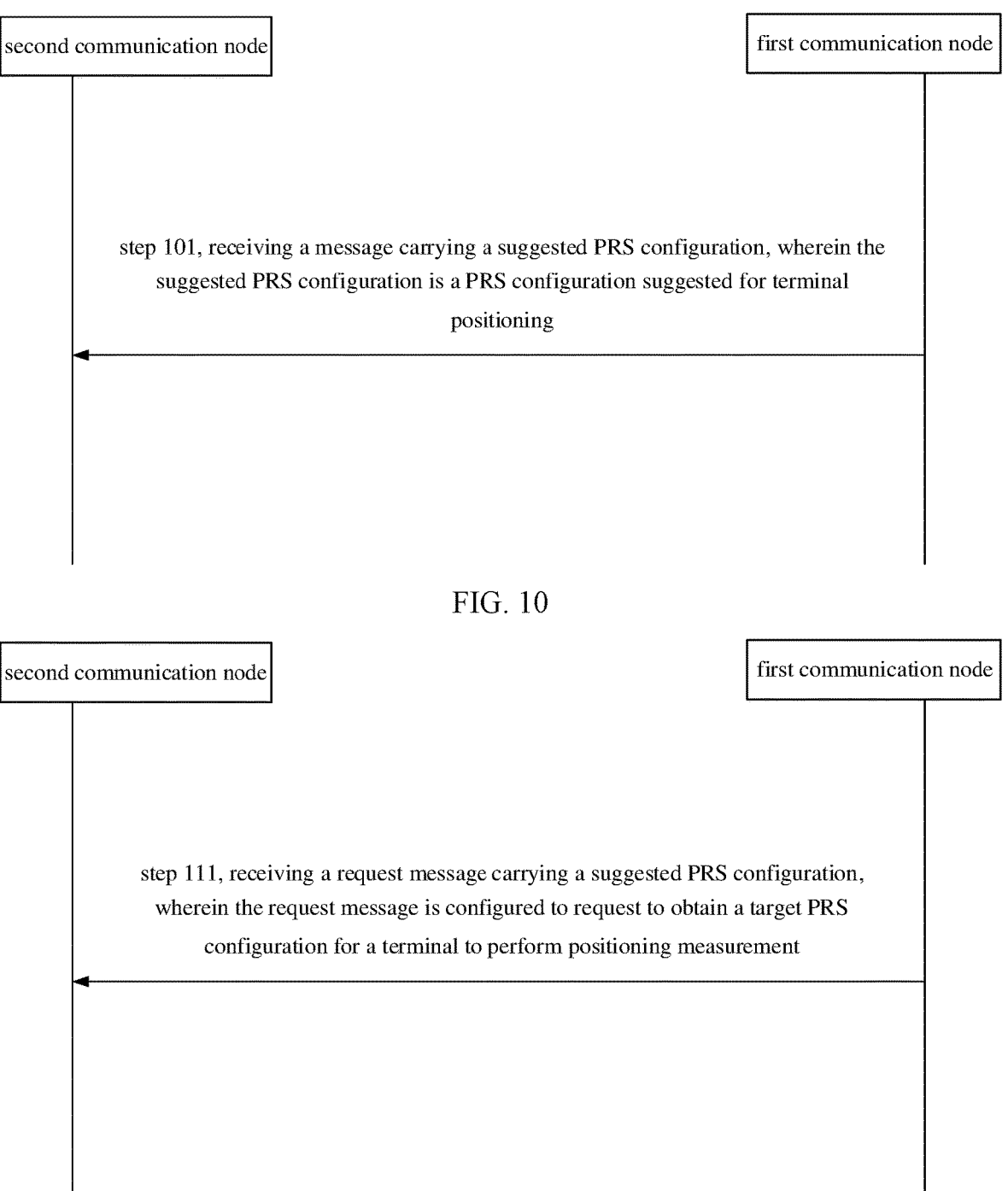
FIG. 10 is a flowchart of a method for requesting a PRS configuration according to some embodiments.
FIG. 11 is a flowchart of a method for requesting a PRS configuration according to some embodiments.

As illustrated in FIG. 10, some embodiments provide a method for requesting a PRS configuration. The method is applicable to a second communication node. The method includes the following.

At step 101: a message carrying a suggested PRS configuration is received, in which the suggested PRS configuration is a PRS configuration suggested for terminal positioning.

In some embodiments of the disclosure, it may be the terminal that sends the message carrying the suggested PRS configuration. The terminal may be, but is not limited to, a mobile phone, a wearable device, a vehicle-mounted terminal, an RSU, a smart home terminal, an industrial sensing device and/or a medical device, and the like. In some embodiments of the disclosure, the second communication node may be a first base station. In some embodiments of the disclosure, the second communication node may be a core network element. In some embodiments of the disclosure, the core network element may be an LMF.

Some embodiments of the disclosure provide a method for a terminal to request a PRS configuration, including: the first base station receiving the message that is sent by the terminal and carries the suggested PRS configuration.

In some embodiments of the disclosure, the first base station is an interface device for the terminal to access the network. The first base station may be various types of base stations, for example, a base station of the 3G network, a base station of the 4G network, a base station of the 5G network, or other evolved base station.

In some embodiments of the disclosure, it may be that the first base station receives an RRC message that carries the suggested PRS configuration and is sent by the terminal. The first base station determines a target PRS configuration based on the suggested PRS configuration and sends an RRC message carrying the target PRS configuration to the terminal; and/or, the first base station determines the target PRS configuration based on the suggested PRS configuration and sends an NRPPa message carrying the target PRS configuration to the LMF.

In some embodiments of the disclosure, after the LMF receives the NRPPa message carrying the target PRS configuration, if TRPs where the terminal performs positioning belong to different base stations, a message carrying the target PRS configuration is sent to a second base station; the multiple different base stations include the first base station and the second base station. In some embodiments, an NRPPa message carrying the target PRS configuration is sent to the second base station.

It should be noted that those skilled in the art can understand that a method for a terminal to request a PRS configuration provided in some embodiments of the disclosure may be executed independently, or may be performed with any one of methods in embodiments of the disclosure or any one of methods in the related art together.

In some embodiments, the second communication node may be a core network element.

Some embodiments of the disclosure provide a method for requesting a PRS configuration, including: the core network element receiving the message that is sent by the terminal and carries the suggested PRS configuration. The core network element may be an LMF.

In some embodiments of the disclosure, the LMF may receive an LPP message that is sent by the terminal and carries the suggested PRS configuration. The LMF determines the target PRS configuration based on the suggested PRS configuration and sends an LPP message carrying the target PRS configuration to the terminal; and/or, the LMF determines the target PRS configuration based on the suggested PRS configuration and sends an NRPPa messages carrying the target PRS to the first base station.

It should be noted that those skilled in the art can understand that a method for a terminal to request a PRS configuration provided in some embodiments of the disclosure may be executed independently, or may be performed with any one of methods in embodiments of the disclosure or any one of methods in the related art together.

In some embodiments, the second communication node may be a first base station.

Some embodiments of the disclosure provide a method for a core network element to request a PRS configuration, which may include: the first base station receiving a message that is sent by the LMF and carries the suggested PRS configuration.

In some embodiments of the disclosure, it may be that the first base station receives an NRPPa message that is sent by the LMF and carries the suggested PRS configuration. The first base station determines the target PRS configuration based on the suggested RS configuration and sends an NRPPa message carrying the target PRS configuration to the terminal; and/or, the first base station determines the target PRS configuration based on the suggested PRS configuration and sends an NRPPa message carrying the target PRS configuration to the LMF, and the LMF then sends an LPP message carrying the target PRS configuration to the terminal.

It should be noted that those skilled in the art can understand that a method for a core network element for requesting a PRS configuration provided in embodiments of the disclosure may be executed independently, or may be performed with any one of methods in embodiments of the disclosure or any one of methods in the related art together.

In some embodiments, there is at least one suggested PRS configuration.

In some embodiments, the suggested PRS configuration includes at least one of the following parameters: a transmission period of the PRS; a transmission bandwidth of the PRS; or a transmission pattern of the PRS.

In some embodiments, the suggested PRS configuration may be determined according to positioning requirements.

In any of the above embodiments, in response to a need of positioning the terminal in real time, the transmission period of the PRS may be set to be smaller than a period threshold at any time. In this way, the terminal can position the terminal in real time. Herein, to position the terminal in real time, a period shorter than a target period may be used as a positioning measurement period to perform positioning measurement on the terminal.

In any of the above embodiments, when a positioning accuracy requirement for positioning the terminal is greater than an accuracy threshold, the transmission bandwidth of the PRS can be set as a first transmission bandwidth at any time; and when the positioning accuracy requirement for positioning the terminal is less than the accuracy threshold, the transmission bandwidth of the PRS can be set as a second transmission bandwidth. Herein, a width corresponding to the first transmission bandwidth is greater than a width corresponding to the second transmission bandwidth.

In any of the above embodiments, when the positioning accuracy requirement for positioning the terminal is greater than the accuracy threshold, the transmission pattern of the PRS can be set as a first transmission pattern at any time; and when the positioning accuracy requirement for positioning the terminal is less than the accuracy threshold, the transmission pattern of the PRS can be set as a second transmission pattern. Herein, a resource distribution density corresponding to the first transmission pattern is greater than a resource distribution density corresponding to the second transmission pattern.

In any embodiment of the disclosure, the first communication node sends the message carrying the suggested PRS configuration, in which the suggested PRS configuration is suggested by the first communication node for positioning the terminal. In this way, the first communication node can determine the suggested PRS configuration according to requirements and send the message carrying the suggested PRS configuration. The second communication node can receive the message carrying the suggested PRS configuration and determine the target PRS configuration from the suggested PRS configuration for the terminal to perform positioning measurement. Compared with the method in which the terminal can use a single PRS configuration only to perform positioning measurement, positioning is performed according to the target PRS configuration determined by the message of the suggested PRS configuration, which can satisfy positioning requirements of different terminals. In some embodiments of the disclosure, the first communication node may be the terminal. In some embodiments of the disclosure, the first communication node may be the core network element.

As illustrated in FIG. 11, some embodiments of the disclosure provide a method for requesting a PRS configuration. The method includes the following step.

At step 111: a request message carrying a suggested PRS configuration is received, in which the request message is configured to request to obtain a target PRS configuration for a terminal to perform positioning measurement; and the suggested PRS configuration for positioning the terminal.

In some embodiments, the second communication node is a first base station.

Some embodiments of the disclosure provide a method for requesting a PRS configuration, including: receiving a random access request message that is sent by the terminal and carries the suggested PRS configuration; or, receiving an RRC message that is sent by the terminal and carries the suggested PRS configuration.

In some embodiments of the disclosure, an RRC message carrying the suggested PRS configuration may be sent to the first base station in response to a positioning requirement of the terminal. Herein, the terminal has the positioning requirement, which may be that an application used for positioning in the terminal is activated.

In some embodiments of the disclosure, the terminal may periodically send an RRC message carrying the suggested PRS configuration to the first base station until it receives an RRC message carrying the target PRS configuration from the first base station. In this way, it can be ensured that the terminal can obtain the target PRS configuration reliably.

Figures 12, 13:
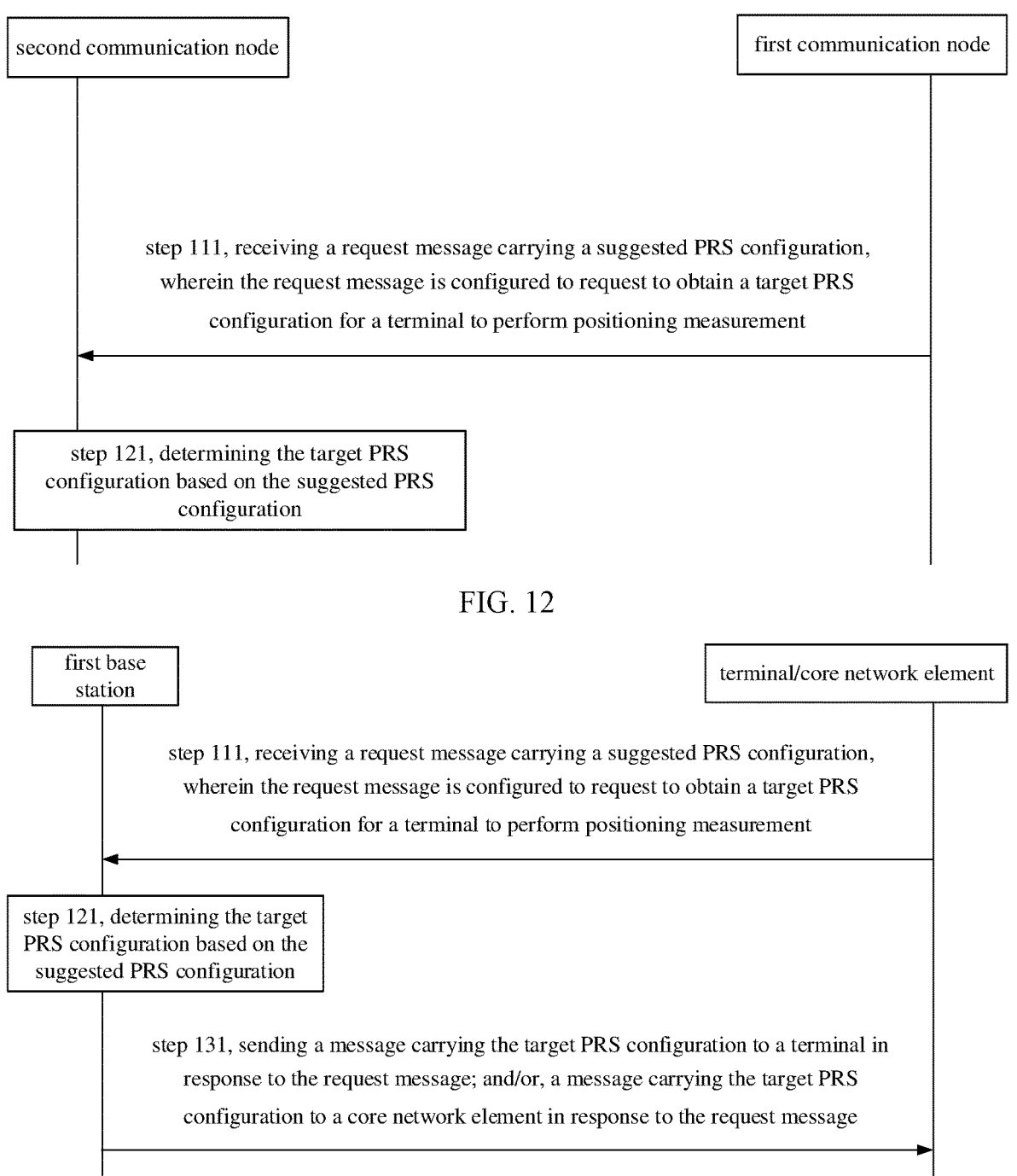
FIG. 12 is a flowchart of a method for requesting a PRS configuration according to some embodiments.
FIG. 13 is a flowchart of a method for requesting a PRS configuration according to some embodiments.

As illustrated in FIG. 12, some embodiments provide a method for requesting a PRS configuration. The method includes the following steps.

At step 121: the target PRS configuration is determined based on the suggested PRS configuration.

In some embodiments of the disclosure, the target PRS configuration may be one selected from a plurality of suggested PRS configurations and/or a PRS configuration.

In some embodiments of the disclosure, the target PRS configuration may be determined based on a channel quality. For example, when the channel quality is greater than a quality threshold, a PRS configuration including a long period for transmitting a PRS may be selected; and when the channel quality is less than the quality threshold, a PRS configuration including a short period for transmitting a PRS may be selected. In this way, it can be ensured that the terminal can reliably receive the PRS.

In some embodiments of the disclosure, the target PRS configuration may be determined according to a bandwidth occupancy ratio of bandwidth resources. For example, when the bandwidth occupancy ratio of the bandwidth resources is smaller than a ratio threshold, a PRS configuration including a large bandwidth for transmitting a PRS can be selected; and when the bandwidth occupancy ratio of the bandwidth resources is greater than the ratio threshold, a PRS configuration including a small bandwidth for transmitting a PRS can be selected.

As illustrated in FIG. 13, some embodiments provide a method for requesting a PRS configuration. The method includes the following steps.

At step 131: a message carrying the target PRS configuration is sent to a terminal in response to the request message; and/or, a message carrying the target PRS configuration is sent to a core network element in response to the request message.

In some embodiments of the disclosure, sending the message carrying the target PRS configuration to the terminal in response to the request message includes: a first base station sending an RRC message carrying the target PRS configuration to the terminal.

In some embodiments of the disclosure, sending the message carrying the target PRS configuration to the core network element in response to the request message includes: a first base station sending an NRPPa message carrying the target PRS configuration to the core network element.

In some embodiments, the second communication node is a core network element; receiving the request message carrying the suggested PRS configuration, includes: the core network element receiving an LPP message that is sent by the terminal and carries the suggested PRS configuration.

In some embodiments of the disclosure, in response to the terminal having a positioning requirement, the LPP message carrying the suggested PRS configuration is sent to the core network element. Herein, the terminal has the positioning requirement, which may be that an application used for positioning in the terminal is activated.

In some embodiments of the disclosure, the terminal may periodically send the LPP message carrying the suggested PRS configuration to the core network element until receiving a message sent by the core network element and carries the target PRS configuration. In this way, it can be ensured that the terminal can obtain the target PRS configuration reliably.

Figure 14:
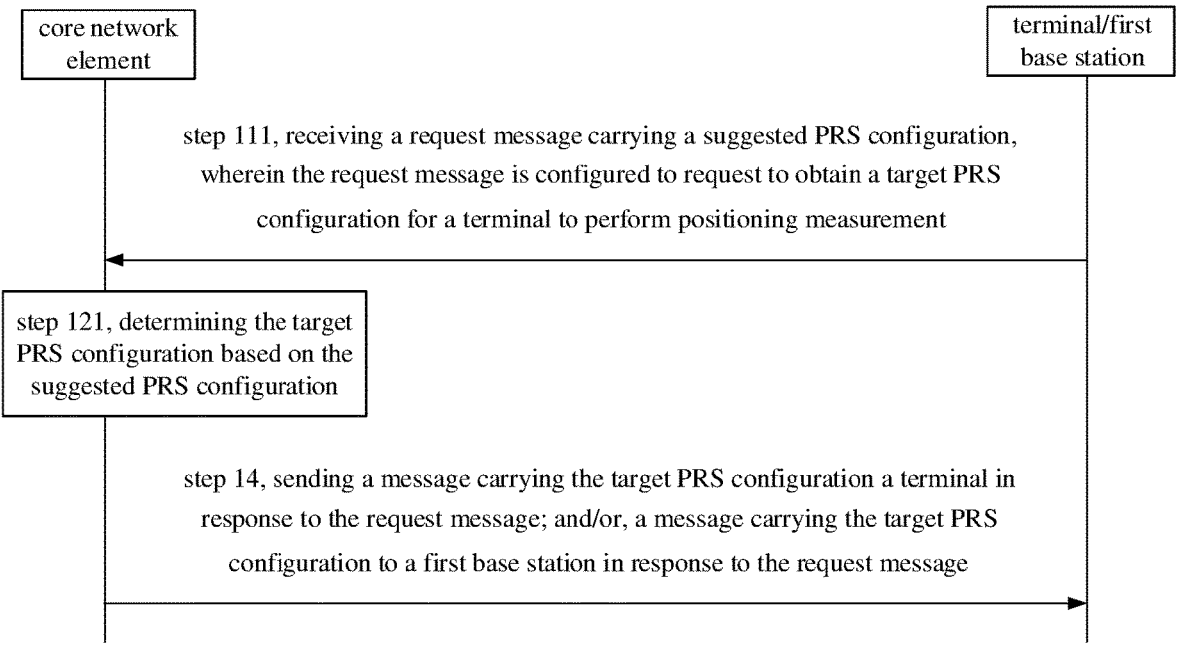
FIG. 14 is a flowchart of a method for requesting a PRS configuration according to some embodiments.

As illustrated in FIG. 14, some embodiments provide a method for requesting a PRS configuration. The method includes the following steps.

At step 14: a message carrying the target PRS configuration is sent to a terminal in response to the request message; and/or, a message carrying the target PRS configuration is sent to a first base station in response to the request message.

In some embodiments of the disclosure, sending the message carrying the target PRS configuration to the terminal in response to the request message includes: the core network element sending an LPP message carrying the target PRS configuration to the terminal.

In some embodiments of the disclosure, sending the message carrying the target PRS configuration to the first base station in response to the request message includes: the core network element sending an NRPPa message carrying the target PRS configuration to the first base station.

In some embodiments, the second communication node is a first base station.

Some embodiments of the disclosure provide a method for requesting a PRS configuration, including: the first base station receiving an NRPPa message that carries the suggested PRS configuration and is sent by the core network element.

In some embodiments of the disclosure, in response to the core network element having a positioning request or the core network element receiving a positioning request, the NRPPa message carrying the suggested PRS configuration may be sent to the first base station.

In some embodiments of the disclosure, it may be that the terminal periodically sends the NRPPa message carrying the suggested PRS configuration to the first base station until it receives an NRPPa message that is sent by the first base station and carries the target PRS configuration. In this way, it can be ensured that the core network element can obtain the target PRS configuration reliably.

Figure 15:
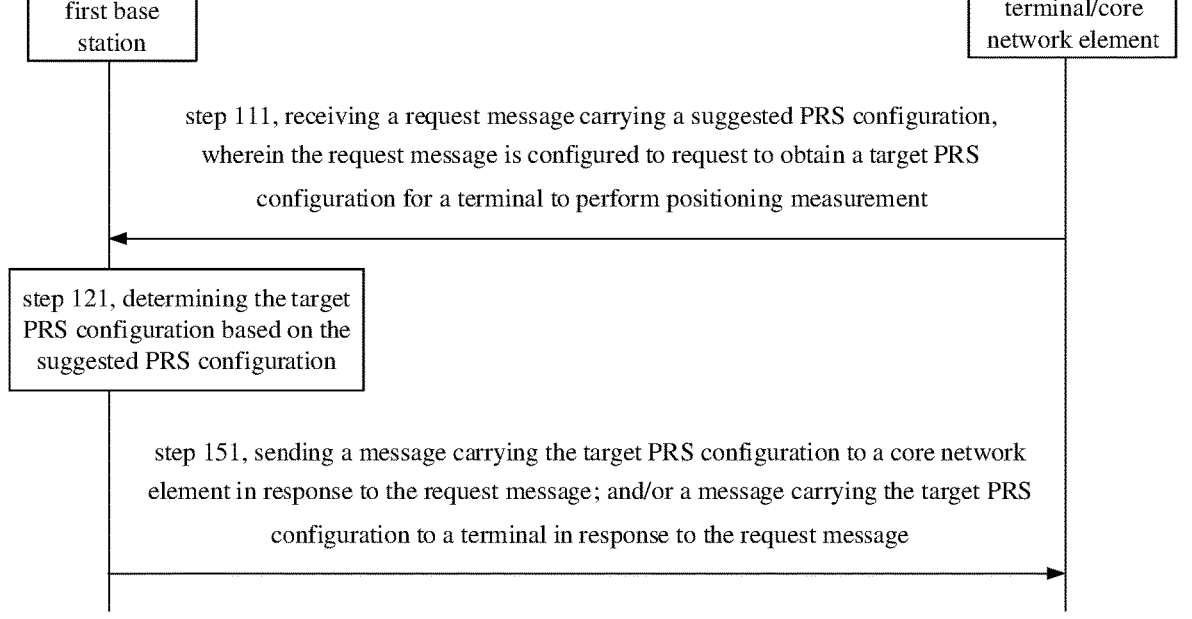
FIG. 15 is a flowchart of a method for requesting a PRS configuration according to some embodiments.

As illustrated in FIG. 15, some embodiments provide a method for requesting a PRS configuration. The method includes the following steps.

At step 151: a message carrying the target PRS configuration is sent to a core network element in response to the request message; and/or a message carrying the target PRS configuration is sent to a terminal in response to the request message.

In some embodiments of the disclosure, sending the message carrying the target PRS configuration to the core network element in response to the request message includes: the first base station sending an NRPPa message carrying the target PRS configuration to the core network element.

In some embodiments of the disclosure, sending the message carrying the target PRS configuration to the terminal in response to the request message includes: the first base station sending an RRC message carrying the target PRS configuration to the terminal.

Figure 16:
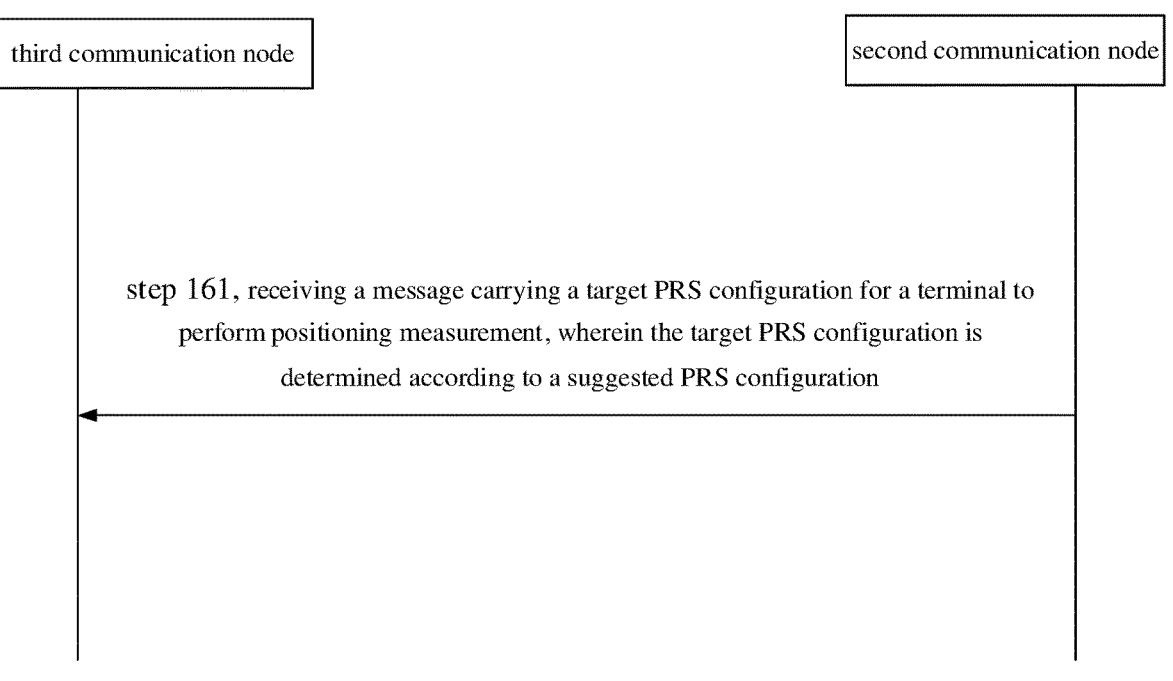
FIG. 16 is a flowchart of a method for requesting a PRS configuration according to some embodiments.

As illustrated in FIG. 16, some embodiments provide a method for requesting a PRS configuration. The method is applicable to a third communication node. The method includes the following step.

At step 161: a message carrying a target PRS configuration is received for a terminal to perform positioning measurement, in which the target PRS configuration is determined based on a suggested PRS configuration.

In some embodiments, the third communication node is a core network element. The core network element may be an LMF. In some embodiments of the disclosure, the third communication node may be a terminal. In some embodiments of the disclosure, the third communication node may be a first base station.

Some embodiments of the disclosure provide a method for a terminal to request a PRS configuration, including: the terminal sending an RRC message carrying the suggested PRS configuration to the first base station. The first base station determines the target PRS configuration based on the suggested PRS configuration and sends an NRPPa message carrying the target PRS configuration to the LMF. The core network element receives the NRPPa message carrying the target PRS configuration for the terminal to perform positioning measurement.

In some embodiments of the disclosure, after the LMF receives the NRPPa message carrying the target PRS configuration, if TRPs where the terminal performs positioning belong to multiple different base stations, a message carrying the target PRS configuration is sent to a second base station; in which the multiple different base stations include the first base station and the second base station. In some embodiments, an NRPPa message carrying the target PRS configuration is sent to the second base station.

It should be noted that those skilled in the art can understand that a method for a terminal to request a PRS configuration provided in some embodiments of the disclosure may be executed independently, or may be performed with any one of methods in embodiments of the disclosure or any one of methods in the related art together.

In some embodiments of the disclosure, the third communication node may be the first base station. The first base station is an interface device for the terminal to access the network. The first base station may be various types of base stations, for example, a base station of the 3G network, a base station of the 4G network, a base station of the 5G network, or other evolved base station.

Some embodiments of the disclosure provide a method for a terminal to request a PRS configuration, including: the terminal sending an LPP message carrying the suggested PRS configuration to a core network element (LMF). The core network element (LMF) determines the target PRS configuration based on the suggested PRS configuration and sends an NRPPa message carrying the target PRS configuration to the first base station. The first base station receives the NRPPa message carrying the target PRS configuration.

It should be noted that those skilled in the art can understand that a method for a terminal to request a PRS configuration provided in some embodiments of the disclosure may be executed independently, or may be performed with any one of methods in embodiments of the disclosure or any one of methods in the related art together.

In some embodiments, the third communication node may be a terminal. The terminal may be, but is not limited to, a mobile phone, a wearable device, a vehicle-mounted terminal, a RSU, a smart home terminal, an industrial sensing device and/or a medical device, and the like.

Some embodiments of the disclosure provide a method for a core network element to request a PRS configuration, which may be the LMF sending an NRPPa message carrying the suggested PRS configuration to a first base station. The first base station determines the target PRS configuration based on the suggested PRS configuration and sends an NRPPa carrying the target PRS configuration to the terminal, and the terminal receives the NRPPa message carrying the target PRS configuration; and/or, the first base station determines the target PRS configuration based on the suggested PRS configuration and sends an NRPPa message carrying the target PRS configuration to the LMF, and the LMF sends an LPP carrying the target PRS configuration to the terminal. The terminal receives the NRPPa message carrying the target PRS configuration.

It should be noted that those skilled in the art can understand that a method for a core network element for requesting a PRS configuration provided in embodiments of the disclosure may be executed independently, or may be performed with any one of methods in embodiments of the disclosure or any one of methods in the related art together.

In some embodiments, there is at least one suggested PRS configuration.

In some embodiments, the suggested PRS configuration includes at least one of the following parameters: a transmission period of the PRS; a transmission bandwidth of the PRS; or a transmission pattern of the PRS.

In some embodiments, the suggested PRS configuration may be determined according to positioning requirements.

In some embodiments, in response to a need of positioning the terminal in real time, the transmission period of the PRS may be set to be smaller than a period threshold at any time. In this way, the terminal can position the terminal in real time. Herein, to position the terminal in real time, a period shorter than a target period may be used as a positioning measurement period to perform positioning measurement on the terminal.

In some embodiments, when a positioning accuracy requirement for positioning the terminal is greater than an accuracy threshold, the transmission bandwidth of the PRS can be set as a first transmission bandwidth at any time; and when the positioning accuracy requirement for positioning the terminal is less than the accuracy threshold, the transmission bandwidth of the PRS can be set as a second transmission bandwidth. Herein, a width corresponding to the first transmission bandwidth is greater than a width corresponding to the second transmission bandwidth.

In some embodiments, when the positioning accuracy requirement for positioning the terminal is greater than the accuracy threshold, the transmission pattern of the PRS can be set as a first transmission pattern at any time; and when the positioning accuracy requirement for positioning the terminal is less than the accuracy threshold, the transmission pattern of the PRS can be set as a second transmission pattern. Herein, a resource distribution density corresponding to the first transmission pattern is greater than a resource distribution density corresponding to the second transmission pattern.

In some embodiments of the disclosure, the third communication node is a core network element.

Receiving the message carrying the target PRS configuration for the terminal to perform positioning measurement includes: the core network element receiving a message that is sent by a first base station and carries the target PRS configuration, in which the target PRS configuration is determined by the first base station based on the suggested PRS configuration carried in a request message sent by the terminal.

In some embodiments of the disclosure, the target PRS configuration may be one PRS configuration selected from a plurality of suggested PRS configurations.

In some embodiments of the disclosure, the target PRS configuration may be determined based on a channel quality. For example, when the channel quality is greater than a quality threshold, a PRS configuration including a long period for transmitting a PRS may be selected; and when the channel quality is less than the quality threshold, a PRS configuration including a short period for transmitting a PRS may be selected. In this way, it can be ensured that the terminal can reliably receive the PRS.

In some embodiments of the disclosure, the target PRS configuration may be determined according to a bandwidth occupancy ratio of bandwidth resources. For example, when the bandwidth occupancy ratio of the bandwidth resources is smaller than a ratio threshold, a PRS configuration including a large bandwidth for transmitting a PRS can be selected; and when the bandwidth occupancy ratio of the bandwidth resources is greater than the ratio threshold, a PRS configuration including a small bandwidth for transmitting a PRS can be selected.

In some embodiments of the disclosure, receiving the message carrying the target PRS configuration for the terminal to perform positioning measurement includes: the core network element receiving an NRPPa message that is sent by the first base station and carries the target PRS configuration.

In some embodiments of the disclosure, the method further includes: in response to TRPs for the terminal to perform positioning belonging to multiple different base stations, sending a message carrying the target PRS configuration to a second base station; in which the multiple different base stations include the first base station and the second base station.

In some embodiments of the disclosure, sending the message carrying the target PRS configuration to the second base station includes: sending an NRPPa message carrying the target PRS configuration to the second base station.

In some embodiments of the disclosure, the third communication node is a first base station; and receiving the message carrying the target PRS configuration for the terminal to perform positioning measurement includes: the first base station receiving a message that is sent by a core network element and carries the target PRS configuration; in which the target PRS configuration is determined by the core network element based on the suggested PRS configuration carried in a request message sent by the terminal In some embodiments of the disclosure, the target PRS configuration may be one PRS configuration selected from a plurality of suggested PRS configurations.

In some embodiments of the disclosure, the target PRS configuration may be determined based on a channel quality. For example, when the channel quality is greater than a quality threshold, a PRS configuration including a long period for transmitting a PRS may be selected; and when the channel quality is less than the quality threshold, a PRS configuration including a short period for transmitting a PRS may be selected. In this way, it can be ensured that the terminal can reliably receive the PRS.

In some embodiments of the disclosure, the target PRS configuration may be determined according to a bandwidth occupancy ratio of bandwidth resources. For example, when the bandwidth occupancy ratio of the bandwidth resources is smaller than a ratio threshold, a PRS configuration including a large bandwidth for transmitting a PRS can be selected; and when the bandwidth occupancy ratio of the bandwidth resources is greater than the ratio threshold, a PRS configuration including a small bandwidth for transmitting a PRS can be selected.

In some embodiments of the disclosure, receiving the message that is sent by the core network element and carries the target PRS configuration includes: the first base station receiving a NRPPa message that is sent by the core network element and carries the target PRS configuration.

In some embodiments of the disclosure, the third communication node is a terminal; and receiving the message carrying the target PRS configuration for the terminal to perform positioning measurement includes: the terminal receiving a message that is sent by a first base station and carries the target PRS configuration; or, the terminal receiving a message that is sent by a core network element and carries the target PRS configuration, in which the target PRS configuration is determined by the first base station based on the suggested PRS configuration carried in a request message sent by the core network element.

In some embodiments of the disclosure, the target PRS configuration may be one PRS configuration selected from a plurality of suggested PRS configurations.

In some embodiments of the disclosure, the target PRS configuration may be determined based on a channel quality. For example, when the channel quality is greater than a quality threshold, a PRS configuration including a long period for transmitting a PRS may be selected; and when the channel quality is less than the quality threshold, a PRS configuration including a short period for transmitting a PRS may be selected. In this way, it can be ensured that the terminal can reliably receive the PRS.

In some embodiments of the disclosure, the target PRS configuration may be determined according to a bandwidth occupancy ratio of bandwidth resources. For example, when the bandwidth occupancy ratio of the bandwidth resources is smaller than a ratio threshold, a PRS configuration including a large bandwidth for transmitting a PRS can be selected; and when the bandwidth occupancy ratio of the bandwidth resources is greater than the ratio threshold, a PRS configuration including a small bandwidth for transmitting a PRS can be selected.

In some embodiments of the disclosure, receiving the message that is sent by the core network element and carries the target PRS configuration includes: the terminal receiving an NRPPa message that is sent by the core network element and carries the target PRS configuration.

In some embodiments of the disclosure, receiving the message that is sent by the core network element and carries the target PRS configuration includes: the terminal receiving an LPP message that is sent by the core network element and carries the target PRS configuration.

Figure 17:
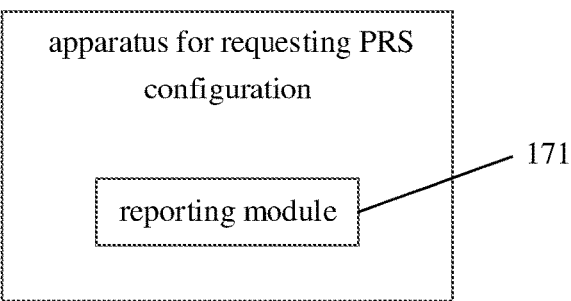
FIG. 17 is a schematic diagram of an apparatus for requesting a PRS configuration according to some embodiments.

As illustrated in FIG. 17, an apparatus for requesting a PRS configuration is provided in some embodiments. The apparatus is applicable to a first communication node. The apparatus includes a reporting module 171.

The reporting module 171 is configured to send a message carrying a suggested PRS configuration, in which the suggested PRS configuration is a PRS configuration suggested by the first communication node for terminal positioning.

Figure 18:
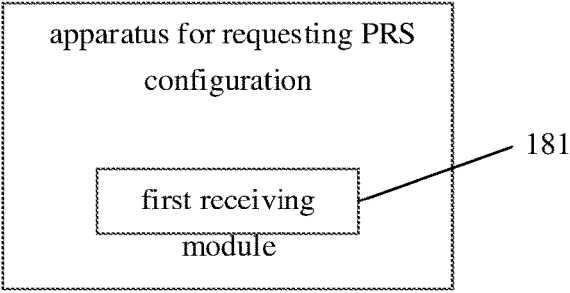
FIG. 18 is a schematic diagram of an apparatus for requesting a PRS configuration according to some embodiments.

As illustrated in FIG. 18, an apparatus for requesting a PRS configuration is provided in some embodiments. The apparatus is applicable to a second communication node. The apparatus includes a first receiving module 181.

The first receiving module 181 is configured to receive a message carrying a suggested PRS configuration, in which the suggested PRS configuration is a PRS configuration suggested for terminal positioning.

Figures 19, 20:
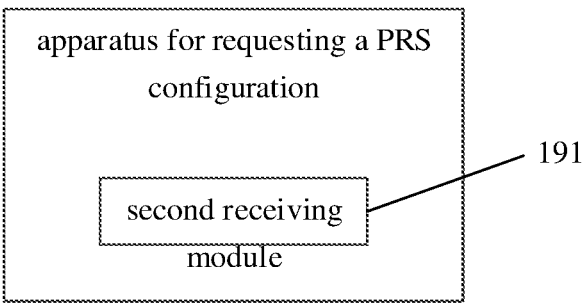
FIG. 19 is a schematic diagram of an apparatus for requesting a PRS configuration according to some embodiments.
FIG. 20 is a block diagram of a base station according to some embodiments.

As illustrated in FIG. 19, an apparatus for requesting a PRS configuration is provided in some embodiments. The apparatus is applicable to a third communication node. The apparatus includes a second receiving module 191.

The second receiving module 191 is configured to receive a message carrying a target PRS configuration for a terminal to perform positioning measurement, in which the target PRS configuration is determined according to a suggested PRS configuration.

With respect to the apparatuses in the above embodiments, the specific manners for performing operations for individual modules therein have been described in detail in the embodiments regarding the methods, which will not be elaborated herein.

Embodiments of the disclosure provide a communication device. The communication device includes: a processor; and a memory for storing processor-executable instructions. The processor is configured to, when executing the executable instructions, perform the method in any embodiment of the disclosure.

The processor may include various types of storage media, which are non-transitory computer storage media that can continue to memorize and store information on the communication device after the power is turned off.

The processor can be connected to the memory through a bus or the like, and is used to read the executable program stored on the memory.

Some embodiments of the disclosure further provide a computer storage medium, in which the computer storage medium stores a computer-executable program, and when the executable program is executed by a processor, the method of any embodiment of the disclosure is performed.

With respect to the devices in the above embodiments, the specific manners for performing operations for individual modules therein have been described in detail in the embodiments regarding the methods, which will not be elaborated herein.

As illustrated in FIG. 20, some embodiments of the disclosure show a structure of a base station. For example, the base station 900 may be provided as a network-side device. Reference to FIG. 20, the base station 900 includes a processing component 922, which further includes one or more processors, and a memory resource represented by a memory 932 for storing instructions executable by the processing component 922, such as application programs. An application program stored in memory 932 may include one or more modules, each corresponding to a set of instructions. Additionally, the processing component 922 is configured to execute instructions to perform any of the aforementioned methods applicable to the base station.

The base station 900 may also include a power component 926 configured to perform power management of the base station 900, a wired or wireless network interface 950 configured to connect the base station 900 to a network, and an input output (I/O) interface 958. The base station 900 may operate based on an operating system stored in the memory 932, such as Windows Server™, Mac OS X™, Unix™, Linux™, FreeBSD™ or the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for requesting a positioning reference signal (PRS) configuration, performed by a terminal, the method comprising:

sending a long-term-evolution positioning protocol (LPP) message carrying a suggested PRS configuration to a core network element, wherein the suggested PRS configuration is a PRS configuration suggested by the terminal for terminal positioning, wherein the method further comprises:

receiving a message that is sent by the core network element and carries a target PRS configuration, wherein the target PRS configuration is determined by the core network element based on the suggested PRS configuration.

2. The method of claim 1, wherein receiving the message that is sent by the core network element and carries the target PRS configuration comprises:

receiving an LPP message that is sent by the core network element and carries the target PRS configuration.

3. The method of claim 1, wherein the suggested PRS configuration comprises at least one of:

a transmission period of the PRS;

a transmission bandwidth of the PRS; or a transmission pattern of the PRS.

4. A communication device, comprising:

an antenna;

a memory; and a processor, connected to the antenna and the memory respectively, and configured to, by executing computer-executable instructions stored on the memory, control transmission and reception of the antenna and perform the method of claim 1.

5. A non-transitory computer-readable storage medium storing instructions that, when executed by a processor, cause the processor to perform the method of claim 1.

6. A method for requesting a positioning reference signal (PRS) configuration, performed by a core network element, the method comprising:

receiving a long-term-evolution positioning protocol (LPP) message carrying a suggested PRS configuration from a terminal, wherein the suggested PRS configuration is a PRS configuration suggested by the terminal for terminal positioning;

determining a target PRS configuration based on the suggested PRS configuration; and feeding, the target PRS configuration by the message carrying the suggested PRS configuration, back to the terminal via a first base station.

7. A communication device, comprising:

an antenna;

a memory; and a processor, connected to the antenna and the memory respectively, and configured to, by executing computer-executable instructions stored on the memory, control transmission and reception of the antenna and perform the method of claim 6.

8. A non-transitory computer-readable storage medium storing instructions that, when executed by a processor, cause the processor to perform the method of claim 6.

9. The method of claim 6, wherein feeding, the target PRS configuration determined by the message carrying the suggested PRS configuration, back to the terminal comprises:

sending an LPP message that carries the target PRS configuration to the terminal.

10. A method for requesting a positioning reference signal (PRS) configuration, performed by a first base station, the method comprising:

receiving a message sent by a core network element and carrying a target PRS configuration, wherein the target PRS configuration is determined by the core network element based on a suggested PRS configuration carried in a long-term-evolution positioning protocol (LPP) message sent by a terminal; and feeding, the target PRS back to the terminal.

11. A communication device, comprising:

an antenna;

a memory; and a processor, connected to the antenna and the memory respectively, and configured to, by executing computer-executable instructions stored on the memory, control transmission and reception of the antenna and perform the method of claim 10.

12. A non-transitory computer-readable storage medium storing instructions that, when executed by a processor, cause the processor to perform the method of claim 10.

13. The method of claim 10, wherein feeding, the target PRS configuration determined by the message carrying the suggested PRS configuration, back to the core network element comprises:

sending an NRPPa message that carries the target PRS configuration to the core network element.

* * * * *